United States Patent

Mayo et al.

Patent Number: 5,868,959
Date of Patent: Feb. 9, 1999

[54] SURFACE MODIFICATION OF MAGNETIC PARTICLE PIGMENTS

[75] Inventors: Philip I. Mayo, Bishops Stortford; Ian T. Morgan, Royston, both of Great Britain; Colin F. Norman, Austin, Tex.; Robert J. D. Nairne, Bishops Stortford, Great Britain

[73] Assignee: Minnesota Mining and Manufacturing Company, St. Paul, Minn.

[21] Appl. No.: 865,361

[22] Filed: May 29, 1997

[30] Foreign Application Priority Data

Jun. 3, 1996 [GB] United Kingdom ............... 9611559

[51] Int. Cl.[6] .................................................. G11B 5/842
[52] U.S. Cl. ...................... 252/62.54; 427/128; 428/403; 428/694 BG
[58] Field of Search ................... 252/62.54; 420/403, 420/694 BG; 427/128

[56] References Cited

U.S. PATENT DOCUMENTS

| | | | |
|---|---|---|---|
| 3,003,965 | 10/1961 | Troelstra et al. | 252/62.54 |
| 4,071,610 | 1/1978 | Koester et al. | 423/634 |
| 4,668,283 | 5/1987 | Honda et al. | 428/403 |
| 4,707,410 | 11/1987 | Hata et al. | 428/413 |
| 5,064,687 | 11/1991 | Matsufuji et al. | 427/132 |
| 5,081,213 | 1/1992 | Carlson | 528/73 |
| 5,176,955 | 1/1993 | Ejiri et al. | 428/336 |
| 5,244,739 | 9/1993 | Carlson et al. | 428/425.9 |
| 5,318,838 | 6/1994 | Matsufuji et al. | 428/328 |
| 5,487,951 | 1/1996 | Evans et al. | 428/523 |
| 5,491,029 | 2/1996 | Evans et al. | 428/423.1 |
| 5,498,685 | 3/1996 | Carlson et al. | 528/71 |
| 5,501,903 | 3/1996 | Erkkila et al. | 428/328 |
| 5,510,187 | 4/1996 | Kumar et al. | 428/425.9 |
| 5,582,910 | 12/1996 | Araki et al. | 428/694 BG |

FOREIGN PATENT DOCUMENTS 4-6619 1/1992 Japan.
6-180838 6/1994 Japan.

OTHER PUBLICATIONS

Inaba et al., "The Advantages of the Thin Magnetic Layer on a Metal Particulate Tape," *IEEE Transactions on Magnetics*, vol. 29, No. 5, Nov. 1993, pp. 3607–3612.

*Primary Examiner*—Melissa Bonner

[57] ABSTRACT

The invention is a surface modifier for magnetic pigments having the formula:

$$(Ar)_n\text{—R—PO}_3\text{H}_2 \qquad (I)$$

where Ar represents an aryl group, R represents an aliphatic group of 1–6 carbons and n is an integer of 1 or more. The invention also includes magnetic recording media made using such surface modifiers.

3 Claims, 3 Drawing Sheets

Fig.1

SURFACE MODIFICATION OF MAGNETIC PARTICLE PIGMENTS

FIELD OF THE INVENTION

The invention relates to the surface modification of magnetic pigments which are suitable for use in magnetic recording media. In particular, the invention relates to improving the dispersability of magnetic pigments having high saturation magnetization and high surface area.

BACKGROUND OF THE INVENTION

Magnetic recording media usually comprise magnetic pigments in a binder, typically a polymeric resin. Such media often use advanced magnetic pigments which possess a high saturation magnetization (>140 emu/g) and coercivity (>2000 Oe). Furthermore, to increase the storage capacity of recording media per unit area, the length of acicular particles or diameter of hexagonal particles has been reduced, increasing the surface area of pigments to in excess of 45 m$^2$/g. The high surface area can render these pigments difficult to disperse.

Magnetic properties can also be improved by increasing the amount of magnetic pigment in the media, by, for example, reducing the amount of non-magnetic material, such as binder, lubricants, dispersing agents, etc. However, such improvement must not sacrifice too much of the physical or mechanical properties of the media. For example, the media must contain sufficient amounts of binder to maintain mechanical strength and durability. Similarly, if the amount of dispersing agent is reduced, care must be taken to provide equivalent or better dispersion properties for the increasingly difficult to disperse magnetic particles.

The binder systems in magnetic media must maintain the extremely small magnetic particles in a fixed position; this permits the particles to be subsequently magnetized and demagnetized, and thus impart a strong, modulated magnetic signal over long exposure to a wide range of environmental and mechanical stresses. Therefore, the binder system must be capable of achieving high tensile strength, flexibility and toughness with high modulus. Preferably, the binder utilizes chemistry which promotes wetting and dispersion of pigment(s).

Traditionally, good pigment wetting has been achieved by selecting suitable dispersing agents, which interact strongly with the pigment surface, and to provide stability to the magnetic particles once dispersed. The move towards higher pigment loading (in excess of 75% by weight of the magnetic layer), and higher pigment surface area, has dictated the need to use higher levels of dispersant at the expense of lower relative levels of binder. In order to overcome the conflict between high pigment loading and increased dispersant content, self-wetting polymers, i.e., multi-functional binders containing "dispersing" groups, have been developed that combine the roles of forming a durable binder matrix and pigment dispersion. These polymers reduce the amount of low molecular weight dispersing agent needed to disperse the particles. Particular polymers containing polar moieties, such as carboxylic acids, sulphonic acids and phosphoric acids, quaternary ammonium groups etc., have been introduced to improve the binders' affinity towards the pigment surface. Good cohesion between pigment and binder, together with good binder mechanical properties ensures that the resultant media exhibits an excellent blend of mechanical and magnetic properties.

Nevertheless, the advances in magnetic pigment technology demand further wetting and modification of the pigment surface to assist the self-wetting polymers to achieve more uniform dispersion of the magnetic pigment. The use of self-wetting binders alone may not produce the desired dispersion properties with the advanced metal particle pigment.

Previously, pigment surface treatment has involved the use of coupling agents, such as, silanes, titanates; or chelating agents, such as, aluminum metal complexes; often during the pigment manufacturing stage to produce pre-treated pigment.

Pigment surface treatments are disclosed in U.S. Pat. No. 5,064,687, U.S. Pat. No. 5,176,955 and U.S. Pat. No. 5,318,838 which describe magnetic recording media having ferromagnetic powder which is treated with an aromatic phosphoric, phosphonic or sulfonic acid and dispersed in a vinyl chloride copolymer. A preferred exemplified surface modifier is phenylphosphonic acid.

It is desired to improve the dispersion properties of magnetic pigments.

SUMMARY OF THE INVENTION

According to the present invention there is provided a magnetic pigment having adsorbed on the surface thereof one or more aralkylphosphonic acids of formula:

$$(Ar)_n\text{—R—PO}_3\text{H}_2 \qquad (I)$$

where Ar represents an aryl group, R represents an aliphatic group of 1–6 carbons and n is an integer of 1 or more.

In a further aspect of the invention, there is provided a magnetic recording medium comprising a nonmagnetic support bearing a coating of a dispersion of a magnetic pigment in a polymer binder, said pigment having absorbed on the surface thereof one or more aralkylphosphonic acids of formula (I).

Surprisingly it has been found that aralkylphosphonic acid modifiers as defined above provide improved properties to magnetic particle pigments compared with the use of phenylphosphonic acid as a modifier.

In a further aspect of the invention there is provided a method of producing a magnetic recording medium comprising mixing a magnetic pigment with a compound of formula (I) with sufficient solvent to produce a smooth magnetic paste, diluting the paste with a solution of binder resin(s) and solvent to produce a percentage of solids that allows for further processing (e.g. sandmilling), processing said dispersion and coating the resulting dispersion on a substrate.

DETAILED DESCRIPTION OF THE INVENTION

Preferred modifiers for use in the invention are of formula (I) in which Ar is phenyl or substituted phenyl, R represents an aliphatic group of 1 or 2 carbons and n is 1 or 2.

The surface modifying agent must contain at least one aromatic ring and a phosphonic acid group, with the phosphonic acid group separated from the aromatic ring(s) by at least one carbon atom. Suitable materials therefore include phenethylphosphonic add (1), benzhydrylphosphonic acid (2), benzylphosphonic acid (3), and substituted derivatives thereof such as 4-nitrobenzylphosphonic acid (4), 3-methoxybenzylphosphonic acid (5), 4-methoxybenzylphosphonic acid (6), 4-t-butylbenzylphosphonic acid (7), 4-methylthiobenzylphosphonic acid (8), 4-methanesulfonylbenzylphosphonic acid (9), 4-trifluoromethylbenzylphosphonic acid (10), 2,3-difluorobenzylphosphonic acid (11) and 2,3,4,5,6-pentafluorobenzylphosphonic acid (12).

The nonmagnetic support may be rigid or flexible. Examples of suitable rigid materials include aluminum, glass etc. A flexible support is preferred, such as a plastic film, especially a polyester film such as poly(ethylene terephthalate) (PET) or poly(ethylene naphthalate) (PEN), typically of thickness 3 to 20 mm preferably 4.5 to 6.5 mm. The support may be coated on one or both major surfaces with a dispersion of a magnetic pigment in accordance with the invention. If only one side of the support is coated with a dispersion of magnetic pigment, the other side is preferably coated with a dispersion of nonmagnetic pigment in a polymer binder. Suitable nonmagnetic pigments include aluminum oxide and carbon black, which may be used to confer appropriate frictional and antistatic properties on the magnetic recording element.

In an alternative construction, two or more layers may be coated on the same side of the support, at least one of said layers comprising a dispersion of a magnetic pigment in accordance with the invention. If both of said layers comprise a dispersion of magnetic pigment, then the magnetic pigments in the separate layers may be of similar or differing coercivities. If only one of said layers comprises a dispersion of magnetic pigment, then the other preferably comprises a dispersion of nonmagnetic particles such as aluminum oxide, titanium dioxide, α-iron oxide or carbon black.

In a preferred embodiment of this construction (which is known as the dual-layer construction), the support bears a smooth layer of a dispersion of nonmagnetic pigment in a polymer binder which is topcoated with a thin layer of a dispersion of magnetic pigment in accordance with the invention. The dual layer construction is described in IEEE Transactions on Magnetics, vol.29(6), 3607–3612 (1993), for example, and is known to provide excellent recording properties.

Any of the polymers known in the art as binders for magnetic recording media may be used as the binder for the magnetic recording media of the present invention. Preferably, the binder forms a chemically crosslinked network (e.g., through radiation curing or through reaction of pendant hydroxy groups with a polyfunctional isocyanate crosslinker), or behaves similarly to a crosslinked network by virtue of chain entanglement and microphase separation, as in the case of the star-block copolymer binders disclosed in U.S. Pat. No. 5,487,951. Preferred binders comprise a combination of "hard" and "soft" resins. The soft resin typically comprises a polyurethane backbone formed by the reaction of one or more polyols with one or more polyisocyanates, while examples of hard resins include polymers and copolymers of vinyl chloride, vinyl acetate, styrene, acrylonitrile, acrylate and methacrylate esters etc. Other resins which have found use as binders for magnetic recording media include phenoxy resins, epoxy resins and polyesters.

The binder preferably comprises pendant polar groups capable of wetting the pigment particles and assisting the dispersion of same. Groups suitable for this purpose include carboxylic, sulphonic, phosphoric and phosphonic acids (and their corresponding salts), quaternary ammonium salts, phosphate esters and phosphonate esters. When the binder comprises a combination of hard and soft resins, either (but preferably both) of the hard and soft components may comprise pendant polar wetting groups. Particularly preferred binders comprise a polyurethane resin having wetting groups which are esters of aminomethylphosphonic acid, as described in U.S. Pat. No. 5,491,029, preferably in combination with a hard resin which is a vinyl polymer equipped with quaternary ammonium wetting groups (as described in U.S. Pat. No. 5,491,029) or a hard resin which is a non-halogenated vinyl polymer comprising a plurality of pendant nitrile groups, a plurality of pendant hydroxyl groups and at least one pendant dispersing group (as described in U.S. Pat. No. 5,501,903).

The magnetic pigment may be selected from a wide variety of finely divided ferromagnetic materials, including gamma iron oxide, cobalt-modified iron oxide, chromium dioxide, barium hexaferrite, strontium hexaferrite, and metal particles consisting predominantly of ferromagnetic metals such as iron. Preferred pigments for use in the invention are fine ferromagnetic metal particles having a basic surface pH (i.e., 7.0 or greater) and a surface area of at least 45 g/m$^2$. The fine ferromagnetic metal particles preferably have a metal content of at least 75 wt %, and at least 80 wt % of said metal content is in the form of one or more ferromagnetic metals or alloys such as iron, cobalt, nickel or alloyed combinations thereof. The relevant ferromagnetic metal particle pigments are well known in the art, and are available commercially.

In the practice of the invention, the finely divided particulate solid is aggressively mixed, at high pigment volume concentration (e.g. >about 15%), in the presence of the surface modifying agent and with sufficient solvent to form a smooth magnetic paste. The surface modifying agent is typically used at the level of 0.5–5.0 wt % of the pigment, preferably 1.0–4.0 wt %. The paste is then slowly diluted with a solution comprised of the binder resin(s) and additional solvents to attain a percentage of solids, by weight, that allows for additional processing, such as ball milling, sandmilling, jet impingement, etc. Additional components, such as head-cleaning agents, anti-static agents, cross-linking agents, fungicides and lubricants may be added during sandmilling of the dispersion and prior to coating, as already known in the art.

Apart from the preparation of the pigment dispersion, the magnetic recording media of the invention may be manufactured by conventional methods. Thus, the dispersion is typically coated on a continuous web substrate by methods such as roller coating, slot coating, gravure coating etc. Prior to coating, crosslinking agents such as polyfunctional isocyanates may be added to the dispersion. The coated web is passed through a series of permanent or solenoidal magnets and drying ovens to align the magnetic pigments and to dry and cure the coating. If the binder comprises unsaturated groups, E-beam or radiation curing may be used to crosslink the coating, and polyfunctional unsaturated monomers may be added to the dispersion prior to coating to assist with this process. If two or more layers are to be coated on the same side or opposite sides, of the substrate, said layers may be applied simultaneously or sequentially. After drying and curing, the coated web is typically calendered then converted to the final product (e.g., tapes or discs) by conventional processes such as slitting and die cutting.

In a preferred embodiment, the magnetic recording media of the invention is a tape, carrying on one surface a magnetic layer containing surface-treated, magnetic pigments of the invention in the binder mixture, and on the opposing side of the base non-magnetic layer containing electrically conducting particles in a cross-linked binder containing hard and soft binder components. In other applications, for example floppy disks or dual magnetic layered tapes, the magnetic layer in this invention may be present on both the major surfaces of the base film, or two or more superposed layers on either or both major surfaces of the base.

The magnetic pigment used in the following Examples was a commercial metal pigment with an intrinsic powder coercivity of 2165 Oe, saturation magnetization at 10 kOe of 146.8 emu/g, surface area of 51.5 m$^2$/g and pH of 9.4.

The phenylphosphonic acid surface modifying agent of the prior art used in these experiments was obtained commercially from Aldrich Chemical Company.

The aralkylphosphonic acid surface modifying agents (1)–(12) were prepared by acid hydrolysis of the corresponding diethyl or dimethyl esters, with the exception of 4-t-butylbenzylphosphonic acid (7) which was prepared from the dimethyl ester by reaction with trimethylsilyl iodide. Diethyl benzylphosphonate was a commercial sample (Aldrich Chemical Co.), while the other diethyl or dimethyl esters were prepared from the corresponding aralkyl halides by reaction with triethyl phosphite or trimethyl phosphite respectively (Arbuzov reaction). Syntheses 1–3 are illustrative of the preparative techniques.

Synthesis 1
Synthesis of Benzylphosphonic Acid

Benzylphosphonic acid was prepared as follows. 200.40 g (878 mmoles) of diethyl benzylphosphonate was combined with 350 ml of distilled water and 350 ml of concentrated (~12 molar) hydrochloric acid. The resulting suspension was heated to reflux under nitrogen for 20 hours, whereupon a clear colorless solution was obtained. From this solution, 130 ml of aqueous distillate was removed. The residue was allowed to cool, forming a thick white slurry which was cooled in situ with an ice bath. The slurry was then filtered dry under vacuum, but not washed due to its fairly high solubility in water. The wet solid was then dried in a vacuum at 120° C. overnight. 123.37 g (82% yield) was obtained.

Synthesis 2
Synthesis of Benzhydrylphosphonic Acid

Benzhydrylphosphonic acid was prepared as follows. 308.93 g (1.25 moles) of bromodiphenylmethane (Aldrich Chemical Company) and 240.93 g (1.45 moles) of triethyl phosphite (Aldrich Chemical Company) were combined under nitrogen, heated carefully and maintained at 160° C. with removal of bromoethane by-product by distillation over a period of 4 hours. 750 ml of concentrated hydrochloric acid (~12 molar) and 250 ml of distilled water was added to the crude product and the mixture was refluxed under nitrogen for two days (approximately 40 hours). The frothy mixture was allowed to cool and then filtered. The resulting solid was then washed with water, to remove the remaining hydrochloric acid, and then with petrol (b.p. 60°–80° C.), to remove hydrocarbon by products, for example 1,1,2,2-tetraphenylethane. The solid was then dried in a vacuum oven at 120° C. 250.06 g (81% yield) was obtained.

Synthesis 3
Synthesis of 4-t-butylbenzylphosphonic acid 4-t-Butylbenzyl bromide (19.16 g, 84 mmol) and triethyl phosphite (10.46, 84 mmol) were heated at 120° C. under argon for 6 hours, after which a further 10.46 g trimethylphosphite was added and heating continued for a further 16 hours. The dimethyl methylphosphonate by-product was distilled off, leaving the desired dimethyl 4-t-butylbenzylphosphonate as a pale yellow oil (20.6 g, 80 mmol).

To a solution of this product in dry acetonitrile (220 ml) under nitrogen was added sodium iodide (25.6 g, 170 mmol) and trimethylsilyl chloride (22 ml, 170 mmol). A precipitate formed immediately, and after 30 minutes' stirring at room temperature, 10 ml ethanol was added and stirring continued a further 30 minutes. After evaporating the solvents, the residue was partitioned between ethyl acetate and water and the aqueous phase discarded. The organic layer was extracted with 2M NaOH, and the alkaline extract was washed with ether, acidified to pH 1 with 10M HCl, then extracted with ethyl acetate (3×100 ml). Evaporation of the dried extracts yielded the desired acid as a pale yellow solid (12.6 g).

Standard Processing Method For Surface Modification of Magnetic Pigments (applied in Examples 1–3)

The magnetic pigment (225 g) and surface modifying agent were added to a Double Planetary Premixer (Charles Ross & Son Company, Model LDM-1) and stirred at low revolution (500 rpm) under a atmosphere of nitrogen for 20 minutes to thoroughly distribute the modifying agent throughout the volume of pigment. A 3:1:1 blend of methylethylketone:cyclohexanone:toluene was then added to the pigment and modifying agent powder to give a mixture in which the pigment and surface modifier together represented 16% of the total volume. This mixture was then aggressively mixed at high revolution (1500 rpm) under normal atmospheric conditions for 40 minutes to obtain a smooth and shiny magnetic paste.

After this initial stage of the process, the paste was then diluted slowly over a period of 20 minutes at high revolution (1500 rpm), with a solution comprising a soft, self-wetting, phosphonated polyurethane Resin A, prepared as described in Example 2 of U.S. Pat. No. 5,501,903 and a hard self-wetting, styrene/acrylonitrile resin, Resin B prepared as described in Example 1 of U.S. Pat. No. 5,501,903 and solvents comprising a 3:1:1 blend of methylethylketone: cyclohexanone: toluene. The resultant dispersion possessed a magnetic pigment weight equivalent to 75% of the total weight of solid material, with the total percentage solids (the ratio of the dry to wet dispersion weight) equivalent to 38%. The dispersion was then mixed in the Double Planetary Premixer for a further 40 minutes at 1500 rpm before being transferred to a horizontal sandmill (Dispermat SL-603). This final sequence in the milling process was accomplished over a period of at least eight hours, to obtain a smooth, uniform dispersion of the magnetic pigment.

Samples of the dispersion were periodically removed from the sandmill and knife coated onto a polyester substrate. The particles were magnetically aligned by pulling the particles through an arrangement of magnetically repelling, permanent magnets (longitudinal magnetic field of 1.1 kOe) immediately after knife coating. After drying under normal room temperature and atmospheric conditions, the surface gloss and bulk magnetic characteristics of each coating were evaluated.

Surface gloss measurements were made at an angle of 45°, normal to the surface of the tape, after calibration of the Rhopoint glossmeter against an ASTM standard.

Bulk magnetic characteristics such as coercivity (Hc) and squareness (Sq) were obtained using a 3000 Oe peak field, 50 Hz LDJ B-H meter.

EXAMPLE 1 (COMPARATIVE)

Sandmilling Comparison of the Effects of Variable Phenylphosphonic Acid—Double Planetary Premixing Treatments on Metal Particles A series of experiments was performed to investigate the effect of the surface modifier phenylphosphonic acid on the bulk dispersion properties using the standard processing procedure. Four experiments were performed, using different added amounts of the modifier over a range of 2.250 g, 4.500 g, 6.750 g and 9.000 g, corresponding to 1%, 2%, 3% and 4% loadings of the surface modifier relative to the weight of pigment respectively. The results obtained from these experiments are presented in Table 1.

TABLE 1

Variation of Viscosity, 45° Gloss and Bulk Magnetic Parameters as a Function of Phenylphosphonic Acid Content.

| Phenylphosphonic Acid | Viscosity (cps) | 45° Gloss | Coercivity (Oe) | Sq |
|---|---|---|---|---|
| 1.0% | 64.3 | 115.2 | 1854 | 0.613 |
| 2.0% | 60.0 | 114.6 | 1878 | 0.626 |
| 3.0% | 55.7 | 115.0 | 1905 | 0.639 |
| 4.0% | 59.7 | 114.5 | 1879 | 0.634 |

EXAMPLE 2

Sandmilling Comparison of the Effects of Variable Benzylphosphonic Acid—Double Planetary Premixing Treatments of Metal Particles This example contains a series of experiments performed with benzylphosphonic acid instead of phenylphosphonic acid (Example 1). The dispersion process (mixing and milling) followed the method outlined above. In this Example, two experiments were performed with addition of benzylphosphonic acid set at the 2% and 3% levels (4.500 g and 6.750 g respectively). The results obtained from these experiments are presented in Table 2.

TABLE 2

Variation of Viscosity, 45° Gloss and Bulk Magnetic Parameters as a Function of Benzylphosphonic Acid Content

| Phenylphosphonic Acid | Viscosity (cps) | 45° Gloss | Coercivity (Oe) | Sq |
|---|---|---|---|---|
| 2.0% | 56.7 | 120.3 | 1895 | 0.631 |
| 3.0% | 51.7 | 119.1 | 1918 | 0.652 |

EXAMPLE 3

Sandmilling Comparison of the Effects of Variable Benzhydrylphosphonic Acid—Double Planetary Premixing Treatments on Metal Particles This Example contains experiments conducted with benzhydrylphosphonic acid. As before, a number of experiments were performed using the standard process in which the amount of modifier was varied over the range 1%, 1.5%, 2%, 2.5% and 3% (corresponding to additions of 2.250 g, 3.375 g 4.500 g, 5.625 g and 6.750 g respectively). The results obtained from these experiments are presented in Table 3.

TABLE 3

Variation of Viscosity, 45° Gloss and Bulk Magnetic Parameters as a Function of Benzhydrylphosphonic Acid Content

| Benzhydrylphosphonic Acid | Viscosity (cps) | 45° Gloss | Coercivity (Oe) | Sq |
|---|---|---|---|---|
| 1.0% | 61.3 | 113.0 | 1865 | 0.617 |
| 1.5% | 55.3 | 108.7 | 1889 | 0.619 |
| 2.0% | 56.0 | 111.8 | 1907 | 0.650 |
| 2.5% | 58.3 | 109.9 | 1914 | 0.655 |
| 3.0% | 44.7 | 98.7 | 1932 | 0.655 |

EXAMPLE 4 (COMPARATIVE)

2.0% Phenylphosphonic Acid—Double Planetary Premixing Treatment, in the Presence of Resin B, On Metal Particles This comparative example was performed to investigate the method and use of phosphonic acid based modifiers as described in U.S. Pat. Nos. 5,064,687; 5,176,955; and 5,318, 838. Following the examples laid out in these patents, a comparative experiment was performed whereby the surface modifying agent was added and double planetary mixed with the magnetic pigment, in the presence of a hard resin.

The magnetic pigment (225 g) was added to a Double Planetary Premixer (Charles Ross & Son Company, Model LDM-1) and stirred at low revolution (500 rpm) under nitrogen for 20 minutes. A solution comprising 4.500 g of phenylphosphonic acid, Resin B, and solvents comprising a 3:1:1 blend of methylethylketone: cyclo hexanone: toluene, was then added to the pigment to yield a pigment/surface modifier volume equal to 16% of the total volume of pigment, surface modifier, binder and solvents. The weight of phenylphosphonic acid used in this formulation corresponds to a loading level of 2%, relative to the weight of pigment. This mixture was then aggressively mixed at high revolution (1500 rpm) under normal atmospheric conditions for 40 minutes to obtain a smooth and shiny magnetic paste.

The paste was then slowly diluted over a period of 20 minutes at high revolution (1500 rpm) with a solution comprising the soft, self-wetting, phosphonated polyurethane Resin A and solvents comprising a 3:1:1 blend of methyl ethyl ketone: cyclohexanone: toluene, to obtain a magnetic pigment weight equivalent to 75% of the total weight of solid material, and a percentage solids (the ratio of the dry to wet dispersion weight) equivalent to 38%. The dispersion was then mixed in the Double Planetary Premixer for a further 40 minutes at 1500 rpm before being transferred to a horizontal sandmill (Dispermat SL-603) where the mixture was milled for a period of at least eight hours to obtain a smooth, uniform dispersion of the magnetic pigment.

Samples of the dispersion were periodically removed from the sandmill and knife coated onto a polyester substrate. The particles were magnetically aligned by pulling the particles through an arrangement of magnetically repelling, permanent magnets (longitudinal magnetic field of 1.1 kOe) immediately after knife coating. After drying under normal room temperature and atmospheric conditions, the surface gloss and bulk magnetic characteristics of each coating were evaluated.

TABLE 4

Viscosity, 45° Gloss and Bulk Magnetic Results for a 2% Loading, with Respect to Pigment Weight, of Phenylphosphonic Acid Double Planetary Mixed in the Presence of the hard Styrene/Acrylonitrile Resin, Resin B.

| Phenylphosphonic Acid | Viscosity (cps) | 45° Gloss | Coercivity (Oe) | Sq |
|---|---|---|---|---|
| 2.0% | 42.3 | 110.3 | 1829 | 0.593 |

Figure 1:
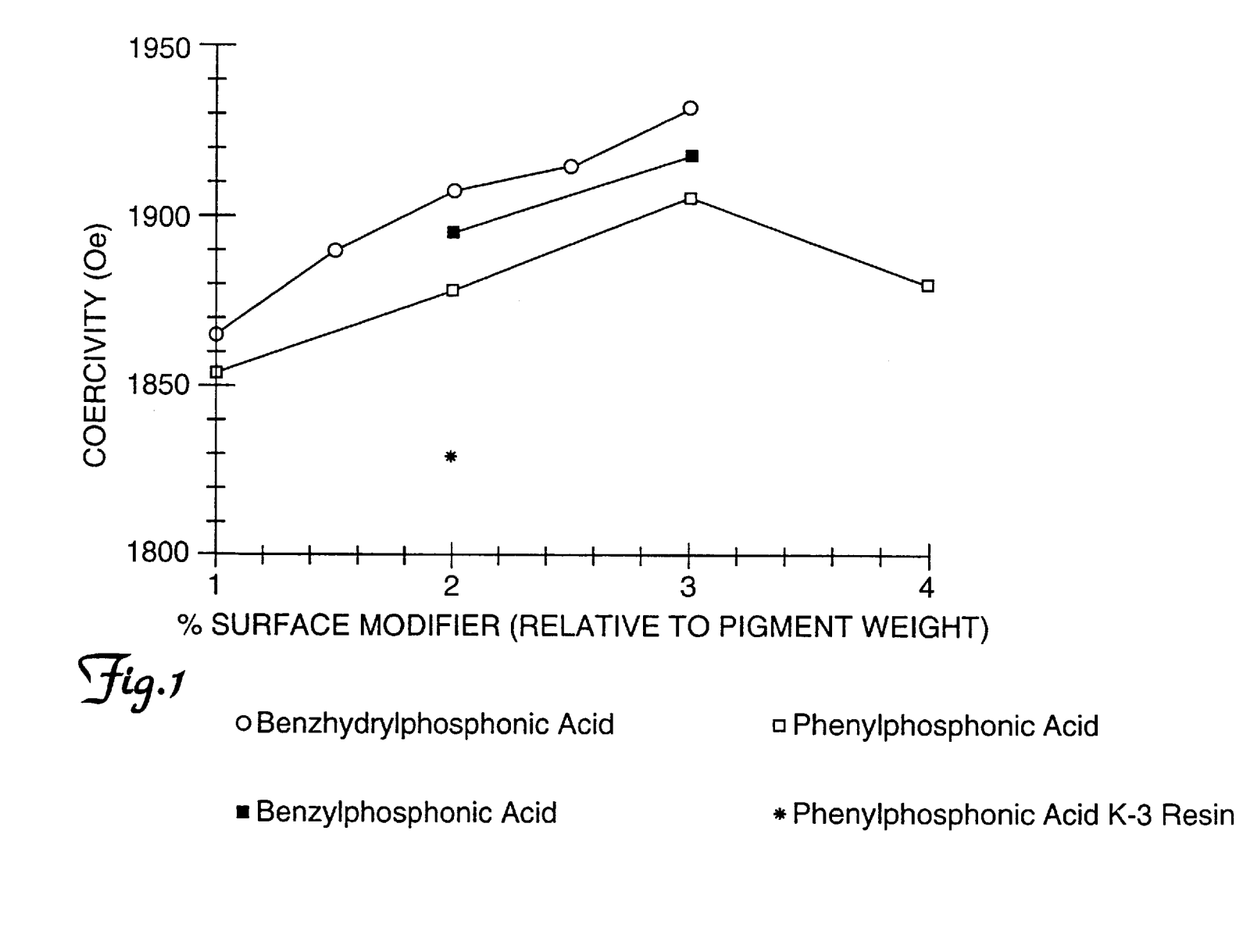
FIG. 1 shows the variation in coercivity for media made with various surface modifiers.
Figure 2:
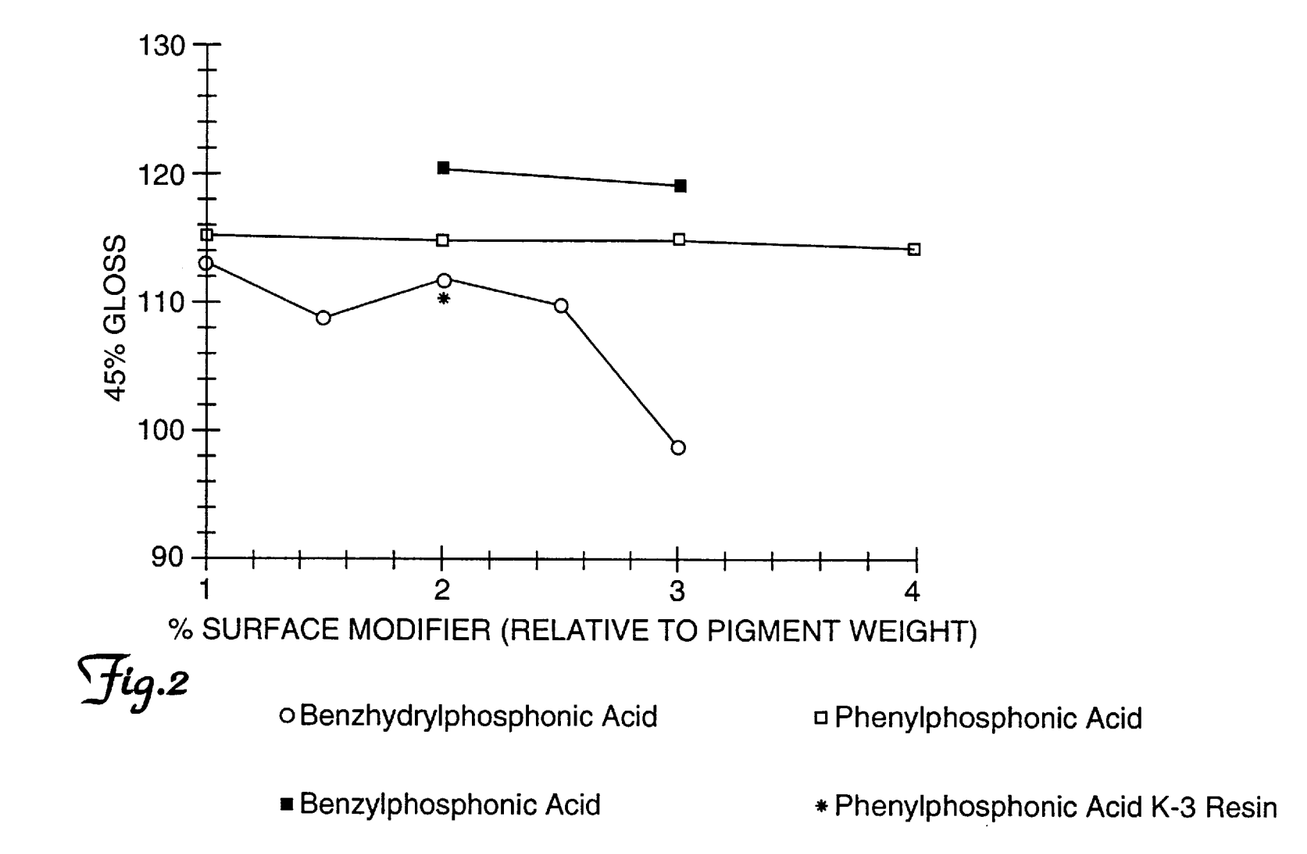
FIG. 2 shows variation in gloss for media made with various surface modifiers.
Figure 3:
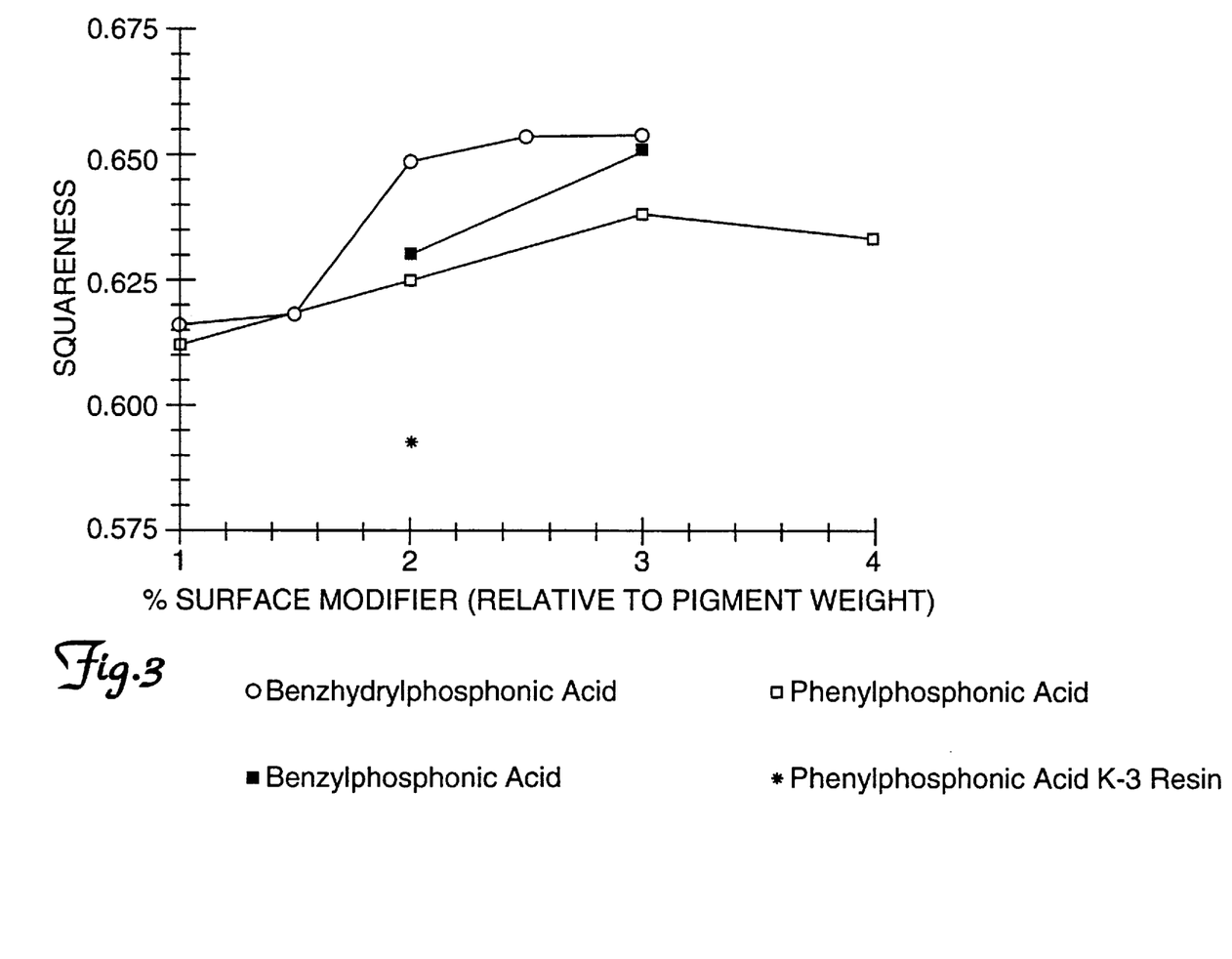
FIG. 3 shows variation in squareness for media made with various surface modifiers.

FIGS. 1, 2 and 3 of the accompanying drawings compare graphically the variations of Coercivity (Hc), Squareness (Sq), and 45° Gloss, recorded as a function of the percentage of surface modifier added to the dispersion relative to the weight of pigment (Tables 1 to 4). Regarding the data presented for phenylphosphonic acid (Example 1), the hysteresis loop measurements indicates that significant improvements in both Hc and Sq may be obtained by increasing the percentage of the modifier. The data further indicates that there exists an upper level, or optimum level of modifier addition, above which further increases of phenylphosphonic acid do not appear to be beneficial. For this particular material the optimum level appeared to be 3%, for this combination of pigment and binders.

Data presented for benzylphosphonic acid also suggests that an optimum level of modifier exists. However, when compared directly to phenylphosphonic acid, the bulk magnetic data and 45° gloss values are significantly improved. Again, the optimum percentage of benzylphosphonic acid surface modifier would appear to be at least 3% for this combination of pigment and binders.

Example 3, benzhydrylphosphonic acid, yields bulk magnetic properties (Hc and Sq) that are greatly improved compared to those obtained from phenylphosphonic acid. More importantly, the optimum percentage of benzhydrylphosphonic acid surface modifier would appear to be no more than 2% for this combination of pigment and binders.

Example 4, using a method described in the prior art, in which 2% of the phenylphosphonic acid surface modifier (relative to the weight of pigment) was double planetary mixed in the presence of a hard styrene/acrylonitrile resin, Resin B, shows consistently poor bulk magnetic and 45° gloss values, when compared to the data for the materials of this invention.

EXAMPLE 5

This example provides further comparison of the surface modifying agents of the invention with those of the prior art. Dispersions were prepared by the same general process as in Examples 1–3 and using the same metal particle pigment. The solvent was a blend of methyl ethyl ketone, tetrahydrofuran and methyl isobutyl ketone in the weight ratio 4:3:3. The composition of the solids content of each dispersion was as follows (all % by weight):

| | |
|---|---|
| Ferromagnetic pigment | 80.00 |
| Surface modifier | 2.40 |
| Alumina | 4.00 |
| Resin A | 5.22 |
| Resin B' | 3.48 |
| Myristic acid | 1.50 |
| Butyl stearate | 0.80 |
| Mondur CB | 2.60 |

Resin B' is a hard resin prepared by the method described in Example 1 of U.S. Pat. No. 5,501,903, but using slightly different proportions of the constituent monomers, namely 72.4% styrene, 24.1% acrylonitrile, 2.5% hydroxypropylacrylate, and 1.0% methacryloxyethyl trimethylammonium chloride (all % by weight). Mondur CB is a polyfunctional isocyanate crosslinking agent, supplied by Mondur.

All dispersions were prepared using a Ross Double Planetary Premixer to predisperse the metal particle pigment with the surface modifier, and a Netzsch Sandmill for milling. Ceramic milling media of average diameter 1 mm were used. The Mondur CB crosslinker was added to the milled dispersion as 55 wt % solution in MEK immediately prior to coating. The dispersion was applied by reverse gravure coating to the front side of a PET web of 6.5 mm thickness immediately after a conventional antistatic coating containing carbon black had been applied to the back side by gravure coating. The coated web was then passed through a series of permanent magnets and ovens in order to align the magnetizable particles and to dry and cure the coatings. The web was then calendered, wound and slit into tapes 6.35 or 8.00 mm wide. The final layer thickness was 1.5 mm (front) and 1.1 mm (back).

Measurements of bulk magnetic properties were carried out using a LDJ M-H meter operating at 3000 Oe and 60 Hz giving the following results.

| Surface Modifier | 45° Gloss | Br | Hc (Oe) | Sq |
|---|---|---|---|---|
| Benzylphosphonic acid | 174 | 2647 | 2051 | 0.79 |
| Benzhydrylphosphonic acid | 178 | 2745 | 1970 | 0.76 |
| Phenylphosphonic acid | 177 | 3297 | 1912 | 0.73 |

Gloss values for all three formulations were similar and consistent with good quality, smooth magnetic tapes. Although the formulation containing phenylphosphonic acid showed the highest value for Br (a measure of remanent magnetization after external field is removed), it also showed significantly lower value of Hc and Sq than the formulations in accordance with the invention. (Hc is a measure of the coercive force required to reverse the magnetization direction of the magnetic particles, and Sq is the squareness, or ratio of remanent to saturation magnetization).

The magnetic properties of the tapes (slit to 6.35 mm width) were measured on a drum tester with a metal-in-gap (MIG) recording head. The measurements were made at a tape speed of 6 m/sec and data rate of 75 and 100 kilo-flux-reversals-per-inch (kfci). Output and signal-to-noise (S/N) values (in dB) obtained for the recording media in accordance with the invention, relative to the media of the prior art, are tabulated below:

| Surface Modifier | Output (75 kfci) | Output (100 kfci) | S/N (75 kfci) | S/N (100 kfci) |
|---|---|---|---|---|
| Benzylphosphonic acid | +5.4 | +7.3 | +9.9 | +0.6 |
| Benzhydrylphosphonic acid | +4.9 | +6.8 | +10.5 | +1.2 |
| Phenylphosphonic acid | 0.0 | 0.0 | 0.0 | 0.0 |

The performance of the media in accordance with the invention is clearly superior.

EXAMPLE 6

This example provides further comparison of the surface modifying agents of the invention with those of the prior art.

Dispersions were prepared by the same general process as in Examples 1–3 and 5, using the same metal particle pigment. The solvent was a blend of methyl ethyl ketone, tetrahydrofuran and methyl isobutyl ketone in the weight ratio 4:3:3. The composition of the solids content of each dispersion was as follows (all % by weight):

| | |
|---|---|
| Ferromagnetic pigment | 85.00 |
| Surface modifier | 2.55 |
| Resin A | 6.57 |
| Resin B' | 4.38 |
| Myristic acid | 1.50 |

The dispersions were prepared using a Ross Double Planetary Mixer to predisperse the metal particle pigment with the surface modifier, and a Dispermat SL-603 horizontal sandmill to obtain a smooth uniform dispersion of the magnetic pigment. Samples of the dispersions were knife coated on a polyester substrate, then immediately pulled through an arrangement of magnetically repelling permanent magnets (longitudinal magnetic field of 1.1 kOe) for magnetic alignment of the particles. After drying under normal room temperature and atmospheric conditions, the surface gloss and bulk magnetic characteristics of the coatings were measured. The viscosity of each of the dispersions was also measured prior to coating.

The results obtained using three different surface modifiers in accordance with the invention, as well as a surface modifier of the prior art (phenylphosphonic acid), are summarized below:

| Surface Modifier | Viscosity (cps) | 45° Gloss | Hc (Oe) | Sq |
|---|---|---|---|---|
| Phenylphosphonic acid (c) | 38 | 99.9 | 1923 | 0.664 |
| 2-Phenethylphosphonic acid | 27 | 105.8 | 1944 | 0.666 |
| Benzylphosphonic acid | 27 | 114.8 | 1946 | 0.682 |
| 4-Nitrobenzylphosphonic acid | 34 | 107.0 | 1982 | 0.675 |

(c) = comparison, not in accordance with the invention.

The surface modifiers of the invention clearly gave rise to dispersions of lower viscosity, which in turn gave coatings with superior gloss and bulk magnetic properties.

EXAMPLE 7

This example demonstrates the superiority of a number of substituted benzylphosphonic acids, compared to phenylphosphonic acid, as surface modifiers for magnetic pigments. The compounds were tested in a formulation prepared by a somewhat different procedure than was followed in previous examples.

The formulation was an adaptation of that used in Example 5, with the alumina omitted and the proportion of ferromagnetic pigment increased to 85 wt % of the total solids. The same proportions of myristic acid and butyl stearate were used as in Example 5, but the surface modifiers were added at a constant molar level (0.015 moles per 100 g pigment). To compensate for the varying weight of surface modifier, it was therefore necessary to adjust the amount of binder and crosslinker used (i.e. Resin A+Resin B'+Mondur CB) accordingly, but maintaining constant proportions of these ingredients relative to each other (Resin A/Resin B' 3:2 by weight, Mondur CB/Resin A 0.69:1 by weight).

A Brabender Plasticorder™ kneading apparatus (C. W. Brabender Instruments Inc., South Hackensack, N.J., U.S.A.) was charged with the magnetic pigment, surface modifier and sufficient tetrahydrofuran to provide an 80 wt % solids dispersion. After 10 minutes mixing at 120 rpm, a 3:2 w/w mixture of Resin A and Resin B' was added as a 28 wt % solution in a blend of methyl ethyl ketone, tetrahydrofuran and methyl isobutyl ketone (4:3:3 by weight), corresponding to half the total amount of binder to be used. Mixing was continued and the torque monitored until a peak in the measured torque was detected (usually 1–3 minutes after adding the binder), after which the kneader was allowed to mix the paste for another 5 minutes. Thereafter, the paste was transferred to a Quickee™ Ball Mill jar (BYK-Gardner Inc., Silver Spring, Md., U.S.A.) along with 3 mm diameter stainless steel balls (about 200 g per 16 g pigment) and the remainder of the binder mixture as a 28 wt % solution in the same solvent blend as before. More of the same solvent blend was added to bring the total solids to 50 wt %, and the mixture was shaken for 90 minutes on a Red Devil™ paint conditioner (BYK-Gardner Inc.). At this point, the myristic acid (10.7 wt % in methyl ethyl ketone) and butyl stearate (neat) were added, along with the Mondur CB (55 wt % in methyl ethyl ketone) and sufficient solvent blend to give 30 wt % solids overall. This mixture was shaken a further 30 minutes, then filtered and coated and evaluated as in previous examples.

The results for 45° gloss, coercivity (Hc) and squareness (Sq) are summarized below for the surface modifier of the prior art (phenylphosphonic acid) and various substituted benzylphosphonic acid surface modifiers of the invention:

| Surface Modifier | Substituent | 45° Gloss | Hc (Oe) | Sq |
|---|---|---|---|---|
| phenylphosphonic acid (c) | — | 95 | 1716 | 0.566 |
| (5) | 3-OMe | 104 | 1805 | 0.604 |
| (6) | 4-OMe | 110 | 1814 | 0.603 |
| (7) | 4-t-Butyl | 98 | 1865 | 0.633 |
| (8) | 4-SMe | 107 | 1812 | 0.619 |
| (9) | 4-SO$_2$Me | 110 | 1796 | 0.615 |
| (10) | 4-CF$_3$ | 121 | 1761 | 0.600 |

(c) = comparison, not in accordance with invention.

The surface modifiers of the invention clearly provided improved bulk magnetic properties and gloss values.

What is claimed is:

1. A method of making a magnetic recording medium comprising the steps of
   providing a substrate,
   mixing a magnetic pigment, a surface modifying compound having the formula $(Ar)_n$—R—PO$_3$H$_2$, where Ar represents an aryl group, R represents an aliphatic group of 1–6 carbons and n is an integer of 1 or more, and solvent to form a smooth paste,
   adding polymeric binders and additional solvent to the smooth paste to form a pre-mix dispersion,
   processing the pre-mix dispersion to form a magnetic coating composition; and
   applying the magnetic coating composition to the substrate.

2. The method of claim 1 wherein the processing step comprises sandmilling.

3. The method of claim 1 wherein the processing step comprises forcing the mixture through a jet impingement apparatus.

* * * * *

UNITED STATES PATENT AND TRADEMARK OFFICE
CERTIFICATE OF CORRECTION

PATENT NO.: 5,868,959

DATED: February 9, 1999

INVENTOR(S): Mayo et al.

It is certified that errors appear in the above-identified patent and that said Letters Patent is hereby corrected as shown below:

Col. 3, line 2, "add" should be --acid--.

Signed and Sealed this

Second Day of November, 1999

Attest:

Attesting Officer

Q. TODD DICKINSON

Acting Commissioner of Patents and Trademarks